March 21, 1939. W. B. CLITHEROW 2,151,266
APPARATUS FOR TEMPERING GLASS
Filed Sept. 16, 1936
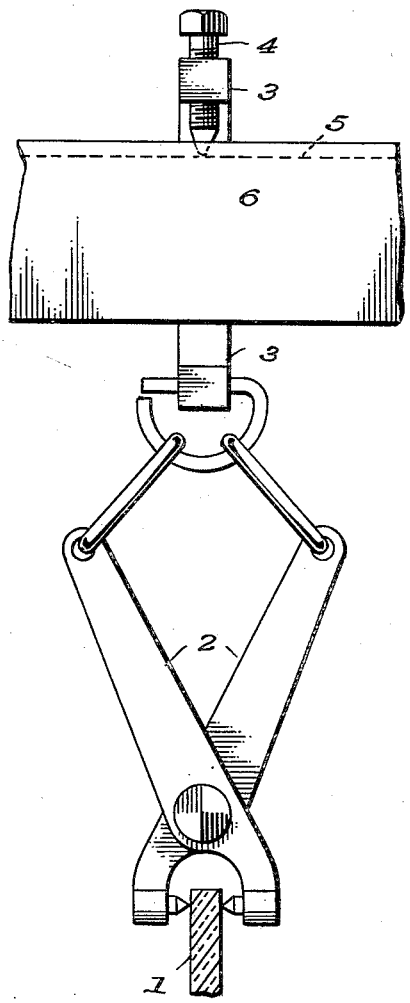
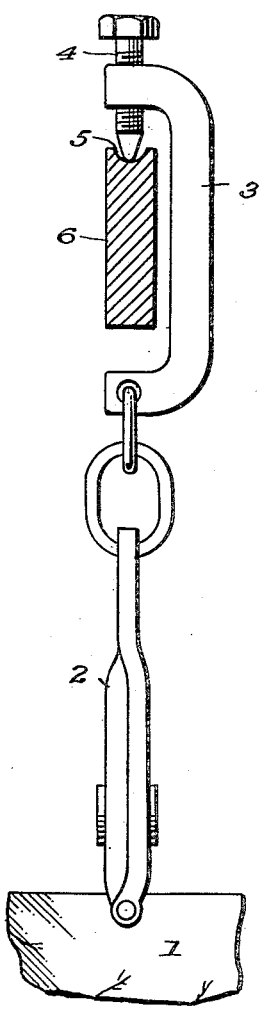
Inventor
William Borthwick Clitherow Patented Mar. 21, 1939

2,151,266

UNITED STATES PATENT OFFICE.

2,151,266

APPARATUS FOR TEMPERING GLASS

William Borthwick Clitherow, St. Helens, England, assignor to The American Securit Company, Washington, D. C., a company of Delaware Application September 16, 1936, Serial No. 101,168
In Great Britain September 19, 1935

5 Claims. (Cl. 49—14)

This invention relates to the tempering of glass and has for its object an improved device for suspending glass sheets.

Glass sheets are usually suspended from a supporting bar by means of tongs or clamps hung on the supporting bar by chain links or the like, so that their lower ends, which grip the glass, have a certain freedom of movement.

It has been found that tongs or the like, so suspended in spite of the freedom of movement given by the chain links, are liable to exercise some force on the glass, either laterally or torsionally, especially when the glass is attached to the tongs or the like without due care.

According to the invention, tongs or the like, suspended from a supporting bar, have a pointed member adapted to rest directly or indirectly on the bar, and serving as a pivot on which the tongs are free to turn or swing. Preferably, a groove or the like is formed in the upper edge of the bar in which the pointed member rests, and the pointed member is made vertically adjustable, as by screwing, in a piece attached to the tongs. The pointed member may be on a goose-neck piece to which the tongs are attached so that the tongs may be lifted on or off the bars.

In the accompanying drawing:

Figure 1 is a front view of a tongs and supporting bar, and,

Figure 2 is a side view thereof.

The glass sheet 1 is gripped by the tongs 2, of which is shown the usual form. The tongs 2 are attached to a goose-neck piece 3, through the upper part of which passes a screw-threaded pointed member 4. A groove 5 is formed in the upper edge of the supporting bar 6, and the pointed member 4 rests in the groove 5. The tongs are free to turn and swing on the pointed member and consequently the tongs cannot exert any torsional force on the glass, and their lower ends have complete freedom of movement in a horizontal plane. Further, after the tongs have been attached to the glass, the pointed member 4 can be moved to a position on the bar in which the tongs are vertical. In the construction shown, the tongs can be at once lifted on or off the bar, and the height of the tongs can be adjusted by turning the screw-threaded member 4.

The invention is applicable to the other forms of tongs and clamps which are sometimes used. Instead of the groove 5, the equivalent construction of a plurality of holes or depressions in the upper edge of the bar 6, may be employed. The pointed member 4 may be supported by the bar 6 indirectly, through the medium of a piece adapted to slide on or be clamped to the bar. Such indirect support is of advantage in the case of curved sheets.

Having described my invention I declare that what I claim and desire to secure by Letters Patent is:

1. A suspension device for supporting a glass sheet for tempering comprising a supporting bar, tongs for gripping said sheet, a member provided with a point attached to said tongs and enggaging said bar and serving as a pivot on which said tongs can turn about a vertical axis and swing in any direction.

2. A suspension device for supporting a glass sheet for tempering comprising a supporting bar, tongs for gripping said sheet, a member provided with a point attached to said tongs and engaging said bar and serving as a pivot on which said tongs can turn and swing in any direction and a depression in the upper edge of said bar to receive the point of said member.

3. A supporting device for supporting a glass sheet for tempering comprising a supporting bar, tongs for gripping said sheet, a member provided with a point resting on said bar and forming a support for said tongs about which it may move in any direction, and a goose neck piece extending between said tongs and said member.

4. A suspension device as claimed in claim 3 wherein said member is adjustably mounted in said goose neck piece.

5. A suspension device for supporting a glass sheet for tempering comprising a supporting bar provided with a longitudinal guiding surface, tongs for gripping said sheet, a member provided with a point attached to said tongs bearing in the guiding surface of said bar and freely movable in respect thereto, and serving as a pivot on which said tongs can turn about a vertical axis and swing in any direction.

WILLIAM BORTHWICK CLITHEROW.